United States Patent
Ogino et al.

(10) Patent No.: US 9,325,955 B2
(45) Date of Patent: Apr. 26, 2016

(54) LIGHT SOURCE APPARATUS AND PROJECTOR APPARATUS WITH OPTICAL SYSTEM HAVING REDUCED COLOR IRREGULARITY

(71) Applicant: CASIO COMPUTER CO., LTD., Shibuya-ku, Tokyo (JP)

(72) Inventors: Hiroshi Ogino, Higashimurayama (JP); Masahiro Ogawa, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 136 days.

(21) Appl. No.: 14/194,025

(22) Filed: Feb. 28, 2014

(65) Prior Publication Data

US 2014/0247429 A1    Sep. 4, 2014

(30) Foreign Application Priority Data

Mar. 1, 2013    (JP) .................................. 2013-040524

(51) Int. Cl.
*H04N 9/31* (2006.01)
*F21V 13/14* (2006.01)
*F21V 14/08* (2006.01)
*G03B 21/20* (2006.01)

(52) U.S. Cl.
CPC .......... *H04N 9/3111* (2013.01); *G03B 21/2066* (2013.01); *H04N 9/3152* (2013.01)

(58) Field of Classification Search
CPC ............. G03B 21/204; G03B 21/2013; G03B 21/2066; H04N 9/3111; H04N 9/3161; H05B 33/145; G02F 1/133617
USPC .......................... 353/31; 359/831–884; 362/84
See application file for complete search history.

(56) References Cited

U.S. PATENT DOCUMENTS

| | | | | |
|---|---|---|---|---|
| 2005/0195371 A1* | 9/2005 | Fuse | .................. | G02B 27/0025 353/69 |
| 2011/0043764 A1* | 2/2011 | Narikawa | ............. | G03B 21/204 353/31 |
| 2011/0043765 A1* | 2/2011 | Shibasaki | .............. | G03B 21/28 353/31 |
| 2011/0063581 A1* | 3/2011 | Iwanaga | ............... | G03B 21/204 353/31 |
| 2011/0075103 A1* | 3/2011 | Ogawa | ................. | G03B 21/204 353/31 |
| 2011/0199580 A1* | 8/2011 | Hirata | .................... | G03B 21/20 353/31 |
| 2011/0234923 A1* | 9/2011 | Yamagishi | ............. | G03B 21/14 348/757 |
| 2012/0162614 A1* | 6/2012 | Kobayashi | ........... | H04N 9/3164 353/31 |
| 2013/0050654 A1* | 2/2013 | Hu et al. | ................ | G03B 33/06 353/31 |

FOREIGN PATENT DOCUMENTS

JP    2007-218956 A    8/2007

* cited by examiner

*Primary Examiner* — Christina Riddle
*Assistant Examiner* — Christopher Lamb, II
(74) *Attorney, Agent, or Firm* — Holtz, Holtz & Volek PC

(57) ABSTRACT

A light source apparatus includes an optical plate, a convergence optical system, a transfer optical system and two casting optical systems. The optical plate includes a translucent segment and a fluorescent substance layer. The convergence optical system converges an excitation light to the translucent segment and to the fluorescent substance layer. The transfer optical system transfers a spot of the excitation light to a transfer plane of the optical plate. The first casting optical system projects a light source image of fluorescence, which is formed on the fluorescent substance layer, onto a common casting plane. The second casting optical system which projects the spot of the excitation light onto the common casting plane. Optical path lengths of the two casting optical systems are the same.

6 Claims, 4 Drawing Sheets

LIGHT SOURCE APPARATUS AND PROJECTOR APPARATUS WITH OPTICAL SYSTEM HAVING REDUCED COLOR IRREGULARITY

CROSS-REFERENCE TO RELATED APPLICATIONS

This U.S. patent application claims priority to Japanese patent application No. 2013-040524 filed on Mar. 1, 2013, the entire contents of which are incorporated by reference herein for correction of incorrect translation.

BACKGROUND OF THE INVENTION

1. Field of the Invention

The present invention relates to a light source apparatus and a projector apparatus with an optical system having reduced color irregularity.

2. Description of the Related Art

A projector apparatus is an apparatus that irradiates a reflective display device such as digital micromirror device or a transmissive display device such as liquid crystal shutter array panel with light emitted from a light source, and projects images generated by the display device onto a screen through a projection lens.

Most projectors have used a high-intensity discharge lamp as their light source. However, in recent years, many projector apparatuses have been developed in which a light emitting diode, laser diode, organic electroluminescence element or the like is used as their light source, and light emitted from the light source is converted to fluorescence of a different color by a fluorescent substance. For example, JP 2007-218956A discloses in FIG. 14 a technique to generate yellow fluorescence by irradiating a spinning color wheel with blue excitation light. This color wheel is a circular glass plate on which a fluorescent substance is partly applied. The yellow fluorescence is generated while the fluorescent substance of the color wheel is irradiated with the excitation light emitted from a blue light emitting diode. In contrast, the blue excitation light passes through the color wheel while a transparent segment of the color wheel is irradiated with the excitation light. The yellow fluorescence emitted from the fluorescent substance of the color wheel and the blue excitation light having passed through the transparent segment of the color wheel both pass through the same optical path to enter a DMD. JP 2007-218956A discloses a technique for combining the optical path of the yellow fluorescence and blue excitation light, an optical path of green light emitted from a green light emitting diode and an optical path of red light emitted from a red light emitting diode.

However, in the technique of the above-mentioned patent literature (JP 2007-218956A), there is a difference in optical path length among the optical path of the blue excitation light from the blue light emitting diode to the DMD, the optical path of the yellow fluorescence from the color wheel to the DMD, the optical path of the green light from the green light emitting diode to the DMD, and the optical path of the red light from the red light emitting diode to the DMD. Therefore, the blue excitation light, yellow fluorescence, green light and red light that enter the DMD have different luminous intensity distributions (light distributions). This results in color irregularity of the mixed light of the blue excitation light, yellow fluorescence, green light and red light that enter the DMD.

It is an object of the present invention to eliminate color irregularity of projection images that are generated from excitation light and color light casted on a casting plane.

SUMMARY OF THE INVENTION

In order to realize the above object, according to a first aspect of the present invention, there is provided a light source apparatus including: a rotary driver; an optical plate which is rotated by the rotary driver and which includes a translucent segment and a fluorescent substance layer; an excitation light source unit which emits excitation light; a convergence optical system which converges the excitation light emitted from the excitation light source unit to the translucent segment and to the fluorescent substance layer; a transfer optical system which transfers a spot of the excitation light converged to the translucent segment by the convergence optical system to a transfer plane different from an optical plate plane of the optical plate; a first casting optical system which projects a light source image of fluorescence onto a common casting plane different from the optical plate plane and from the transfer plane, wherein the convergence optical system converges the excitation light to the fluorescent substance layer to form the light source image of the fluorescence on the fluorescent substance layer; and a second casting optical system which projects the spot of the excitation light transferred on the transfer plane by the transfer optical system onto the common casting plane, wherein an optical path length of the first casting optical system from the optical plate plane to the common casting plane is equal to an optical path length of the second casting optical system from the transfer plane to the common casting plane.

BRIEF DESCRIPTION OF THE DRAWING

The present invention will become more fully understood from the detailed description given hereinbelow and the appended drawings which are given by way of illustration only, and thus are not intended as a definition of the limits of the present invention, and wherein.

DETAILED DESCRIPTION OF THE PREFERRED EMBODIMENT

Hereinafter, an embodiment of the present invention will be described with reference to the drawings. Though various technical limitations which are preferable to perform the present invention are included in the after-mentioned embodiment, the scope of the invention is not limited to the following embodiment and the illustrated examples.

(First Embodiment)

Figure 1:
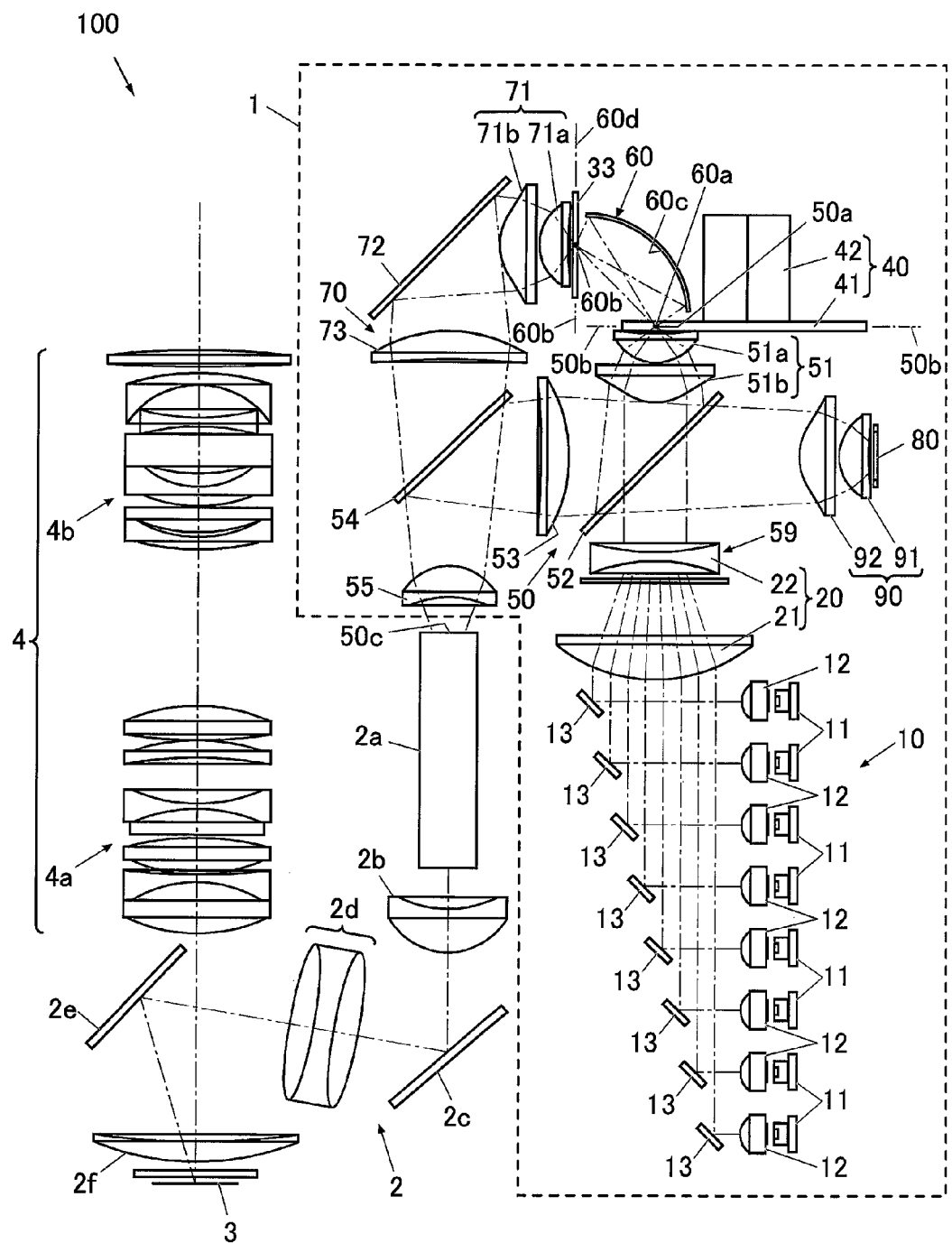
FIG. 1 is a plan view of a projector apparatus according to a first embodiment of the present invention.

FIG. 1 is a plan view of a projector apparatus 100.

As illustrated in FIG. 1, the projector apparatus 100 includes a light source apparatus (time-sharing light generating apparatus, sequential color generating apparatus) 1, a light source optical system 2, a display device 3, a projection optical system 4, and the like.

The light source apparatus 1 emits a plurality of colors of light divided by time as its outgoing light. That is, the plurality of colors of light are repeatedly emitted from the light source apparatus 1 in rotation. Specifically, the light source apparatus 1 repeatedly emits red light, green light and blue light in rotation. If the plurality of colors of light sequentially emitted from the light source apparatus 1 are mixed, white light is obtained.

The light source optical system 2 casts the red, green and blue lights emitted from the light source apparatus 1 on the display device 3. The light source optical system 2 includes a light guiding apparatus 2a, a lens 2b, an optical axis diverting mirror 2c, a lens group 2d, an illumination mirror 2e and a field lens 2f. The field lens 2f is included in both the light source optical system 2 and the projection optical system 4.

The light guiding apparatus 2a is a light tunnel or a light rod. The incidence face (common casting face) 50c of the light guiding apparatus 2a is a casting face common to the red, green and blue lights, and the light source apparatus 1 casts the red, green and blue lights on the incidence face 50c. The light guiding apparatus 2a reflects or totally-reflects the red, green and blue lights emitted from the light source apparatus 1 on its side wall for multiple times, so as to process the red, green and blue lights into respective beams with uniform intensity distribution. The lens 2b casts the red, green and blue lights guided by the light guiding apparatus 2a toward the optical axis diverting mirror 2c as well as condenses these lights. The optical axis diverting mirror 2c reflects the red, green and blue lights casted by the lens 2b toward the lens group 2d. The lens group 2d casts the red, green and blue lights reflected on the optical axis diverting mirror 2c toward the illumination mirror 2e. The illumination mirror 2e reflects the lights casted by the lens group 2d toward the display device 3. The field lens 2f casts the lights reflected on the illumination mirror 2e toward the display device 3.

The display device 3 is a spacial light modulator that generates an image by modulating the red, green and blue lights irradiated through the light source optical system 2 pixel by pixel. Specifically, the display device 3 is a digital micromirror device (DMD) that includes a plurality of movable micromirrors arranged in a two-dimensional array and the like. The display device 3 is driven by a driver. That is, while the display device 3 is irradiated with the red light, each movable micromirror of the display device 3 is individually controled (e.g. by PWM control) so as to control a ratio of a time (duty ratio) during which the red light is reflected toward the projection optical system 4. In this way, the display device 3 generates a red color image. The same can be said while the display device 3 is irradiated with the green or blue light.

Instead of a reflection spacial light modulator, the display device 3 may also be a transmission spacial light modulator (e.g. liquid crystal shutter array panel—so-called liquid crystal display device). If the display device 3 is a transmission spacial light modulator, the optical design of the light source optical system 2 can be changed accordingly. That is, the display device 3 is disposed between the projection optical system 4 and the light source optical system 2 such that the optical axis of the red, green and blue lights emitted through the light source optical system 2 is coincident with the optical axis of the projection optical system 4 (described below).

The projection optical system 4 is disposed opposite the display device 3, and the extended optical axis of the projection optical system 4 intersects the display device 3 (specifically, at a right angle). The projection optical system 4 casts the light reflected on the display device 3 toward the front so as to project the image generated by the display device 3 onto a screen. The projection optical system 4 includes a movable lens group 4a, a fixed lens group 4b and the like. Shifting the movable lens group 4a makes it possible to change the focal length of the projection optical system 4 as well as to perform focusing.

The light source apparatus 1 includes an excitation light source unit 10, a narrowing optical system 20, a translucent diffuser plate 33, an excitation light converting apparatus 40, a first casting optical system 50, a transfer optical system 60, a second casting optical system 70, a second light source 80, a condensing optical system 90 and the like.

The second light source 80 is a semiconductor light emitting element, more specifically a light emitting diode. By being driven by a driver circuit, the second light source 80 blinks or is modulated. A blinking cycle of the second light source 80 is so fast that blinking cannot be recognized by a human eye.

The condensing optical system 90 is a lens group including lenses 91 and 92. The condensing optical system 90 is opposed to the second light source 80, and the optical axis of the condensing optical system 90 is coincident with the optical axis of the second light source 80. The condensing optical system 90 condenses the light emitted from the second light source 80 and makes the light be like parallel light.

The excitation light source unit 10 emits an excitation beam which is approximately parallel light. The optical axis of the excitation beam emitted from the excitation light source unit 10 orthogonally intersects the optical axis of the light emitted from the second light source 80.

The color of the excitation beam emitted from the excitation light source unit 10 is different from the color of the light emitted from the second light source 80. Specifically, the excitation beam emitted from the excitation light source unit 10 is visible light with a short wavelength and a high energy (in particular, monochromatic visible light), preferably a blue beam among three primary colors of light. In contrast, the light emitted from the second light source 80 is visible light with a long wavelength and a low energy (in particular, monochromatic visible light), preferably red light among three primary colors of light.

The excitation beam emitted from the excitation light source unit 10 is a bundle of excitation laser beams that travel in parallel to each other. Specifically, the excitation light source unit 10 includes a plurality of excitation light sources 11, a plurality of collimator lenses 12 and a plurality of reflection mirrors 13. The excitation light sources 11 are semiconductor light emitting elements, more specifically blue laser diodes. The excitation light sources 11 are disposed in the same direction as the second light source 80 so that the optical axes of the excitation light sources 11 are parallel to the optical axis of the second light source 80. The excitation light sources 11 are arranged in a two-dimensional array (in a grid pattern) on a plane perpendicular to the sheet of FIG. 1. The plurality of collimator lenses 12 are arranged in a two-dimensional array (in a grid pattern) on a plane perpendicular to the sheet of FIG. 1. The collimator lenses 12 respectively are opposed to respective excitation light sources 11. The reflection mirrors 13 are opposed to the excitation light sources 11 and collimator lenses 12, and the optical axes of the laser beams emitted from the excitation light sources 11 are oblique to the reflection mirrors 13 so that the optical axes of the laser beams collimated by the collimator lenses 12 are diverted by 90° on the reflection mirrors 13. The reflection mirrors 13 are arranged in steps. The interval of the laser beams collimated by the collimator lenses 12 are narrowed by the reflection mirrors 13. The beam diameter of the bundle of all laser beams after being reflected on the reflection mirrors 13 is narrower than the beam diameter of the bundle of all laser beams before being reflected on the reflection mirrors 13. The laser beams reflected on the reflection mirrors 13 travel approximately in parallel, i.e. the bundle of these laser beams are approximately parallel light. This bundle of laser beams is the excitation beam (blue beam) that is emitted from the excitation light source unit 10.

By being driven by a driver circuit, the excitation light source 11 blinks or is modulated. A blinking cycle of the excitation light source 11 is so fast that blinking cannot be recognized by a human eye. While the excitation light source 11 is on, the second light source 80 is off. While the second light source 80 is on, the excitation light source 11 is off.

The narrowing optical system 20 is a lens group including lenses 21 and 22. The narrowing optical system 20 is disposed in the area toward which the laser beams are reflected by the reflection mirrors 13. The narrowing optical system 20 is disposed such that the optical axis of the narrowing optical system 20 is coincident with the optical axis of the bundle of the laser beams reflected on the reflection mirrors 13. The optical axis of the narrowing optical system 20 orthogonally intersects the optical axis of the second light source 80 and the optical axis of the condensing optical system 90. The narrowing optical system 20 narrows the diameter of the excitation beam emitted from the excitation light source unit 10. That is, the narrowing optical system 20 condenses the bundle of the laser beams reflected on the plurality of reflection mirrors 13 so as to narrow the interval of the laser beams.

The first casting optical system 50 includes a lens group (first lens group) 51, a first dichroic mirror 52, a lens (first lens) 53, a second dichroic mirror 54 and a lens 55.

The first dichroic mirror 52 is disposed at the intersection of the optical axis of the narrowing optical system 20 with the optical axis of the condensing optical system 90. The first dichroic mirror 52 intersects the optical axis of the narrowing optical system 20 at an oblique angle of 45°, and also intersects the optical axis of the condensing optical system 90 at an oblique angle of 45°. The first dichroic mirror 52 reflects light within a predetermined band (green light) but transmits light outside the predetermined band (red light, blue light). Specifically, the first dichroic mirror 52 transmits the excitation beam (blue beam) that has passed through the narrowing optical system 20 and transmits the red light that has passed through the condensing optical system 90, but reflects fluorescence (green light) that is converted from the excitation beam by means of the excitation light converting apparatus 40 (described below).

The lens group 51 includes lenses 51a and 51b. The lens group 51 is opposed to the narrowing optical system 20 across the first dichroic mirror 52, and the optical axis of the lens group 51 is coincident with the optical axis of the narrowing optical system 20.

The lens group 51 converges the excitation beam narrowed by the narrowing optical system 20 to form a spot (convergence spot) 50a of the excitation light (blue light). The plane including the spot 50a and perpendicular to the optical axis of the lens group 51 is referred to as a convergence plane 50b. The lens group 51 is opposed to the convergence plane 50b. The convergence plane 50b includes a transparent segment 41c and a fluorescent substance layer 41d (described below).

A convergence optical system 59 is a combination of the narrowing optical system 20, the lens group 51 and the first dichroic mirror 52, which converges the excitation beam emitted from the excitation light source unit 10. The narrowing optical system 20, the lens group 51 and the first dichroic mirror 52 are shared by the convergence optical system 59 and the first casting optical system 50. The narrowing optical system 20, the lens group 51 and the first dichroic mirror 52 serve as a part of both the convergence optical system 59 and the first casting optical system 50.

The lens 53 is opposed to the condensing optical system 90 across the first dichroic mirror 52. The optical axis of the lens 53 is coincident with the optical axis of the condenser optical axis 90. The lens 55 is disposed at the side of the narrowing optical system 20, and the optical axis of the lens 55 is parallel to the optical axis of the narrowing optical system 20. The lens 55 is disposed such that the optical axis of the lens 55 orthogonally intersects the optical axis of the condensing optical system 90 and lens 53 on the side of the lens 53 opposite the condensing optical system 90.

The second dichroic mirror 54 is disposed at the intersection of the optical axis of the lens 53 with the optical axis of the lens 55. The second dichroic mirror 54 intersects the optical axis of the lens 53 at an oblique angle of 45°, and also intersects the optical axis of the lens 55 at an oblique angle of 45°. The second dichroic mirror 54 is parallel to the first dichroic mirror 52. The second dichroic mirror 54 reflects light within a predetermined band (green light, red light) but transmits light outside the predetermined band (blue light). Specifically, the second dichroic mirror 54 reflects the green light (fluorescence) and red light that have passed through the lens 53, but transmits the transmitted light (blue light) that is converted from the excitation beam by means of the excitation light converting apparatus 40 (described below).

The light emitted from the second light source 80 and condensed by the condensing optical system 90 passes through the first dichroic mirror 52 toward the lens 53, and then is condensed by the lens 53. Then, the light is reflected on the second dichroic mirror 54 toward the lens 55, and is condensed by the lens 55. In this way, a light spot (convergence spot) of the light emitted from the second light source 80 is formed on the incidence face 50c (casting plane common to the color lights) of the light guiding apparatus 2a. The spot is larger than the second light source 80. That is, an enlarged image of the second light source 80 is projected (formed) onto the incidence face 50c of the light guiding apparatus 2a by the optical system that is composed of the condensing optical system 90, first dichroic mirror 52, lens 53, second dichroic mirror 54 and lens 55. The incidence face 50c of the light guiding apparatus 2a is exactly opposed to the lens 55, and orthogonally intersects the optical axis of the lens 55. In the embodiment, the incidence face 50c of the light guiding apparatus 2a serves as the common casting plane on which the color lights emitted from the excitation light converting apparatus 40 (described below) are casted. However, the common casting plane may be defined at any position in the light path common to the color lights emitted from the excitation light converting apparatus 40.

The excitation light converting apparatus 40 converts the excitation beam converged by the lens group 51 alternately to the fluorescence (green light) and to the diffused and transmitted light (blue light).

The excitation light converting apparatus 40 includes an optical plate 41 and a spindle motor (rotary drive) 42. The optical plate 41 is configured in a disk shape, and the spindle motor 42 is coupled to the optical plate 41 at the center of the optical plate 41. The optical plate 41 orthogonally intersects the optical axis of the lens group 51 at the spot 50a of the excitation light, and is on the convergence plane 50b.

Figure 2:
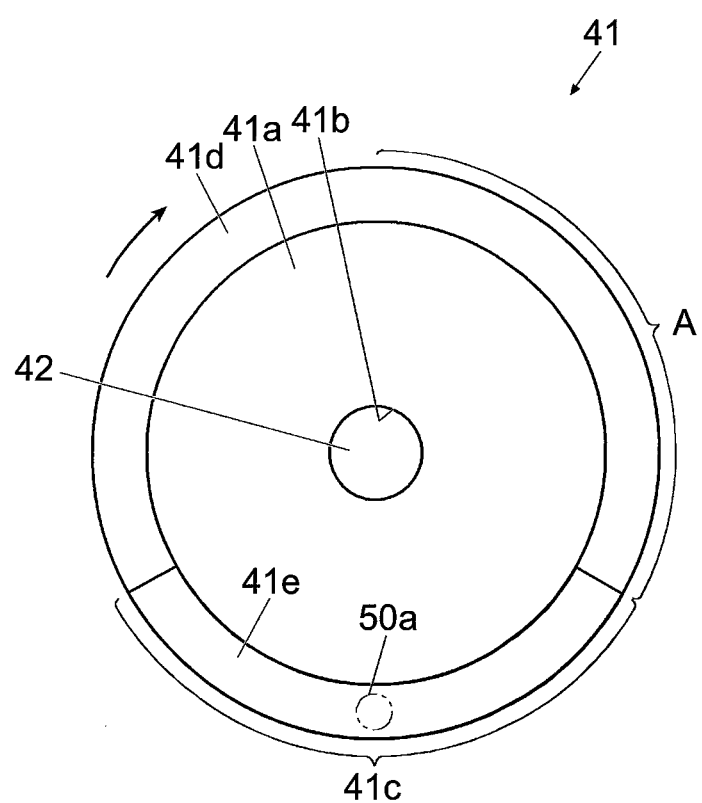
FIG. 2 is a plan view of an optical plate according to the first embodiment.

FIG. 2 is a plan view of the optical plate 41. The viewing angle of FIG. 2 is perpendicular to the viewing angle of FIG. 1.

The optical plate 41 includes a wheel plate 41a, a fluorescent substance layer 41d, a translucent diffuser plate 41e and the like. Roughly speaking, the structural shape of the wheel plate 41a is a disk. At the center of the wheel plate 41a, an attachment hole 41b is provided, in which a drive shaft of the spindle motor 42 is fixedly fitted. The drive shaft of the spindle motor 42 is parallel to the optical axis of the lens group 51 and the narrowing optical system 20, and the wheel plate 41a orthogonally intersects the optical axis of the lens group 51 and the narrowing optical system 20. The front face of the wheel plate 41a faces the lens group 51, and the back face of the wheel plate 41a faces the opposite side.

The wheel plate 41a includes a translucent segment 41c at the periphery part thereof, and the translucent segment 41c extends in the circumferential direction. As used herein, the term "circumferential direction" refers to a circumferential direction about the drive shaft of the spindle motor 42, and the term "axial direction" refers to the direction in which the drive shaft of the spindle motor 42 extends.

The fluorescent substance layer 41d is applied on the front face of the wheel plate 41a. The joining interface between the fluorescent substance layer 41d and the wheel plate 41a is mirror-finished, which improves usage rate of the fluorescence emitted from the fluorescent substance layer 41d.

Seen in the axial direction, the fluorescent substance layer 41d extends in the circumferential direction forming a band of circular arc. The fluorescent substance layer 41d and the translucent segment 41c are formed alongside in the circumferential direction, and the fluorescent substance layer 41d and the translucent segment 41c are on the same plane. That is, seen in the axial direction, the fluorescent substance layer 41d and the translucent segment 41c are arranged along the same circumference about the drive axis of the spindle motor 42. Instead of a band of circular arc, the fluorescent substance layer 41d may also be formed on the entire front face of the wheel plate 41a. Besides, the fluorescent substance layer 41d may also be formed in a sector form about the drive axis of the spindle motor 42.

The disk-shaped translucent diffuser plate 41e is provided on the translucent segment 41c of the wheel plate 41a.

The optical plane of the optical plate 41, which includes the translucent segment 41c and the fluorescent substance layer 41d, is coincident with the convergence plane 50b. By the spindle motor 42 spinning the wheel plate 41a, the fluorescent substance layer 41d and the translucent segment 41c (translucent diffuser plate 41e) alternately cross the optical axis of the lens group 51. While the fluorescent substance layer 41d is crossing the optical axis of the lens group 51, the excitation beam is converted into the fluorescence. That is, the fluorescent substance layer 41d is irradiated with the excitation light in the form of the spot 50a, and the irradiated part is therefore excited by the excitation light to emit the fluorescence. The fluorescence emitted from the fluorescent substance layer 41d may be within any wavelength band as long as the color of the fluorescence is different from the color of the excitation light. However, monochromatic visible light is preferred. For example, the fluorescence emitted from the fluorescent substance layer 41d is green light. Since the fluorescence is emitted from the part (spot 50a) of the fluorescent substance layer 41d irradiated with the excitation light, the irradiated part (spot 50a) can be considered as a light source image of the fluorescence. That is, the spot 50a of the excitation light is converted into the light source image of the fluorescence by means of the fluorescent substance layer 41d, and the light source image of the fluorescence is formed on the fluorescent substance layer 41d (convergence plane 50b).

In contrast, while the translucent segment 41c (translucent diffuser plate 41e) is crossing the optical axis of the lens group 51, the excitation beam is converted into the diffused and transmitted light. That is, when the translucent diffuser plate 41e is irradiated with the excitation light in the form of the spot 50a, the directivity of the excitation light is decreased by the diffusing function of the translucent diffuser plate 41e, and then the excitation light passes through the translucent diffuser plate 41e. The transmitted light that has passed through the translucent diffuser plate 41e has the same wavelength band with the excitation light, and the transmitted light is the same color as the excitation light. Since the transmitted light is emitted from the part (spot 50a) of the translucent diffuser plate 41e irradiated with the excitation light, the irradiated part (spot 50a) can be considered as a light source image of the transmitted light. That is, the spot 50a of the excitation light is converted into the light source image of the transmitted light by means of the translucent diffuser plate 41e, and the light source image of the transmitted light is formed on the translucent diffuser plate 41e (convergence plane 50b).

Because the part irradiated with the excitation light changes due to the rotation of the translucent diffuser plate 41e, noise (speckle noise) can be reduced from the transmitted light that has passed through the translucent diffuser plate 41e.

Since the excitation light source 11 is blinking, it does not happen that the excitation light source 11 is kept off throughout the period during which the translucent segment 41c (translucent diffuser plate 41e) is crossing the optical axis of the lens group 51. Similarly, it does not happen that the excitation light source 11 is kept off throughout the period during which the fluorescent substance layer 41d is crossing the optical axis of the lens group 51. For example, the excitation light source 11 is off while part A (e.g. half) of the fluorescent substance layer 41d along the circumferential direction is crossing the optical axis of the lens group 51. Meanwhile, the excitation light is on while the other part of the fluorescent substance layer 41d or the translucent segment 41c is crossing the optical axis of the lens group 51.

As illustrated in FIG. 1, the fluorescence emitted from the fluorescent substance layer 41d is condensed by the lens group 51, reflected on the first dichroic mirror 52 toward the lens 53, condensed by the lens 53, reflected on the second dichroic mirror 54 toward the lens 55, and then condensed by the lens 55. In this way, the spot (convergence spot) of the fluorescence emitted from the fluorescent substance layer 41d is formed on the incidence face 50c of the light guiding apparatus 2a. The spot is larger than the light source image of the fluorescence and the spot 50a. That is, an enlarged image of the light source image of the fluorescence is projected (formed) onto the incidence face 50c of the light guiding apparatus 2a by the first casting optical system 50.

The transfer optical system 60 transfers the light source image (spot 50a) of the transmitted light on the convergence plane 50b (particularly on the translucent segment 41c) onto the transfer plane 60d. That is, the light source image projected on the convergence plane 50b is further projected onto the transfer plane 60d. It is preferred that an image of the light source image (spot 50a) of the transmitted light on the convergence plane 50b is projected onto the transfer plane 60d at the same magnification by the transfer optical system 60. The transfer plane 60d intersects the convergence plane 50b. Specifically, the transfer plane 60d is perpendicular to the convergence plane 50b. The transfer plane 60d is disposed between the optical axis of the lens 55 and the optical axis of the lens group 51. The transfer plane 60d is parallel to the optical axis of the lens 55 and the optical axis of the lens group 51.

The transfer optical system 60 is an ellipsoidal concave mirror 60c. The ellipsoidal concave mirror 60c has a first focal point (first convergence spot) 60a and a second focal point (second convergence spot) 60b. The first focal point 60a is positioned at a point on the optical axis of the excitation light source unit 10, narrowing optical system 20 and lens group 51 as well as on the convergence plane 50b. That is, the first focal point 60a is coincident with the intersection of the optical axis of the excitation light source unit 10, narrowing optical system 20 and the lens group 51 with the convergence plane 50b. Therefore, the light source image (spot 50a) of the transmitted light is formed at the first focal point 60a.

The second focal point 60b is positioned at a point on the optical axis of the lens group 71 of the second casting optical system 70 as well as on the transfer plane 60d. That is, the second focal point 60b is coincident with the intersection of the optical axis of the lens group 71 with the transfer plane 60d. The second focal point 60b and the first focal point 60a are in symmetry with respect to the plane that includes the second dichroic mirror 54.

The concave mirror 60c is a spheroidal mirror whose surface is defined by rotating an elliptic curve whose focal points are the first focal point 60a and the second focal point 60b about an axis connecting the first focal point 60a and the second focal point 60b. The rotational symmetry axis connecting the first focal point 60a and the second focal point 60b is perpendicular to the plane that includes the second dichroic mirror 54. The concave mirror 60c is disposed at the side of the convergence plane 50b opposite the lens group 51 and at the side of the transfer plane 60d opposite the lens group 71.

The transmitted light that has passed through the translucent diffuser plate 41e is reflected on the concave mirror 60c toward the second focal point 60b, and the reflected light is converged to the second focal point 60b. That is, the concave mirror 60c forms a spot of the transmitted light that has passed through the translucent diffuser plate 41e at the second focal point 60b, and the concave mirror 60c thus transfers the light source image of the transmitted light at the first focal point 60a to the second focal point 60b. It is preferred that the spot (light source image) of the transmitted light on the transfer plane 60d has the same diameter as that on the convergence plane 50b.

On the transfer plane 60d, a translucent diffuser plate 33 is disposed. The translucent diffuser plate 33 is disposed on the transfer plate 60d, and the second focal point 60b is positioned on the translucent diffuser plate 33. The translucent diffuser plate 33 may be either fixed or movable (e.g. rotatable, oscillatable, vibratable) along the transfer plane 60d. If the translucent diffuser plate 33 is movable, the translucent diffuser plate 33 is driven by the spindle motor 42 or the other drivers.

The second casting optical system 70 includes a lens group (second lens group) 71, a flat mirror 72, a lens (second lens) 73, the second dichroic mirror 54 and the lens (third lens) 55. The second dichroic mirror 54 and the lens 55 are shared by the second casting optical system 70 and the first casting optical system 50. The second dichroic mirror 54 and the lens 55 serve as a part of both the second casting optical system 70 and the first casting optical system 50.

The lens group 71 includes lenses 71a and 71b. The lens group 71 is disposed opposite to the concave mirror 60c with respect to the translucent diffuser plate 33 and transfer plane 60d, and between the optical axis of the lens group 51 and the optical axis of the lens 55. The lens group 71 is opposed to the translucent diffuser plate 33 and the transfer plate 60d, and the optical axis of the lens group 71 is perpendicular to the translucent diffuser plate 33 and the transfer plane 60d. The optical axis of the lens group 71 orthogonally intersects the optical axis of the lens group 51, as well as orthogonally intersects the optical axis of the lens 55. The flat mirror 72 is disposed at the intersection of the optical axis of the lens group 71 with the optical axis of the lens 55. The flat mirror 72 intersects the optical axis of the lens group 71 at an oblique angle of 45°, and also intersects the optical axis of the lens 55 at an oblique angle of 45°. The flat mirror 72, the second dichroic mirror 54 and the first dichroic mirror 52 are parallel to each other. The flat mirror 72 is opposed to the first dichroic mirror 52. The distance from the plane that includes the second dichroic mirror 54 to the flat mirror 72 is equal to the distance from the plane that includes the second dichroic mirror 54 to the first dichroic mirror 52. The lens 73 is disposed between the flat mirror 72 and the second dichroic mirror 54. The lens 73 is opposed to the lens 55, and the optical axis of the lens 73 is coincident with the optical axis of the lens 55.

The lens group 71 and the lens group 51 are in symmetry with respect to the plane that includes the second dichroic mirror 54. The lens 73 and the lens 53 are in symmetry with respect to the plane that includes the second dichroic mirror 54.

The light (excitation light) converged to the second focal point 60b by the concave mirror 60c is condensed by the lens group 71, is reflected on the flat mirror 72 toward the lens 73, is condensed by the lens 73, passes through the second dichroic mirror 54 toward the lens 55, and is condensed by the lens 55. In this way, a spot (convergence spot) of the light that has passed through the transfer plane 60d is formed on the incidence face 50c of the light guiding apparatus 2a. The formed spot is larger than the spot on the transfer plane 60d. That is, an enlarged image of the light source image of the transmitted light that is transferred on the transfer plane 60d is projected (formed) onto the incidence face 50c of the light guiding apparatus 2a by the second casting optical system 70.

The lens group 71 is the same as the lens group 51, and the lens 73 is the same as the lens 53. In view of the foregoing, the optical path length (the term "optical path length" refers to a distance along optical axes) from the transfer plane 60d through the lens group 71, the flat mirror 72, the lens 73, the second dichroic mirror 54 and the lens 55 to the incidence face 50c of the light guiding apparatus 2a is equal to the optical path length from the convergence plane 50b through the lens group 51, the first dichroic mirror 52, the lens 53, the second dichroic mirror 54 and the lens 55 to the incidence face 50c of the light guiding apparatus 2a. Further, the first casting optical system 50 and the second casting optical system 70 can be configured to have the same optical property. For example, the first casting optical system 50 and the second casting optical system 70 have the same refractive power.

As a result, on the incidence face 50c of the light guiding apparatus 2a, the fluorescence (green light) and the excitation light (blue light) have the same light distribution (luminous intensity distribution). Furthermore, this feature can prevent misalignment between the irradiation areas of the fluorescence and the excitation light that enter the incidence face 50c of the light guiding apparatus 2a. Therefore, if the incidence face 50c of the light guiding apparatus 2a were irradiated simultaneously with the fluorescence (green light) and the excitation light (blue light), the mixed light would exhibit little color irregularity. Furthermore, this feature enables standardization of the components between the lens group 71 and the lens group 51 and between the lens 73 and the lens 53, which achieves reduction of the production cost.

Because the light source image of the transmitted light (excitation light) on the convergence plane 50b is transferred to the transfer plane 60d by means of the transfer optical system 60, it becomes possible to equalize the optical path length of the transmitted light from the transfer plane 60d to the incidence face 50c of the light guiding apparatus 2a with the optical path length of the fluorescence from the convergence plane 50b to the incidence face 50c of the light guiding apparatus 2a although the direction of the transmitted light (excitation light) travelling from the optical plate 41 is opposite to the direction of the fluorescence travelling from the optical plate 41. Furthermore, the optical axis of the excitation light casted on the convergence plane 50b is made parallel to the optical axis of the lights casted on the incidence face 50c of the light guiding apparatus 2a. Thereby the size of the apparatus is reduced in the lateral direction of FIG. 1 (the direction parallel to the optical axis of the lens 53).

Because the transfer optical system 60 includes the concave mirror 60c having the two focal points 60a and 60b, the configuration of the transfer optical system 60 can be minimized. Furthermore, because the concave mirror 60c is a spheroidal mirror, it is possible to bring the focal points 60a and 60b closer while reducing the footprint of the concave mirror 60c. Furthermore, it is possible to configure that the focal points 60a and 60b are in symmetry with respect to the plane that includes the second dichroic mirror 54. As a result, it is possible to configure that the path of the excitation light from the transfer plane 60d to the second dichroic mirror 54 and the path of the fluorescence from the convergence plane 50b to the second dichroic mirror 54 are in symmetry with respect to the plane that includes the second dichroic mirror 54. That is, the footprint of the lens group 71, flat mirror 72 and lens 73 does not exceed the footprint of the lens group 51, first dichroic mirror 52 and lens 53. The footprint of the lens group 71, flat mirror 72 and lens 73 can be thus minimized.

Furthermore, the concave mirror 60c is disposed in the area between the convergence plane 50b and the transfer plane 60d. Further, the concave mirror 60c is disposed in the area between the spindle motor 42 and the lens group 71. Therefore, these areas can be effectively utilized for placing the concave mirror 60c.

As a result, the lens group 51, lens 53, dichroic mirrors 52 and 54, concave mirror 60c, lens 71, flat mirror 72 and lens 73 can be arranged in a small space, so the size of the whole apparatus is reduced.

(Second Embodiment)

Figure 3:
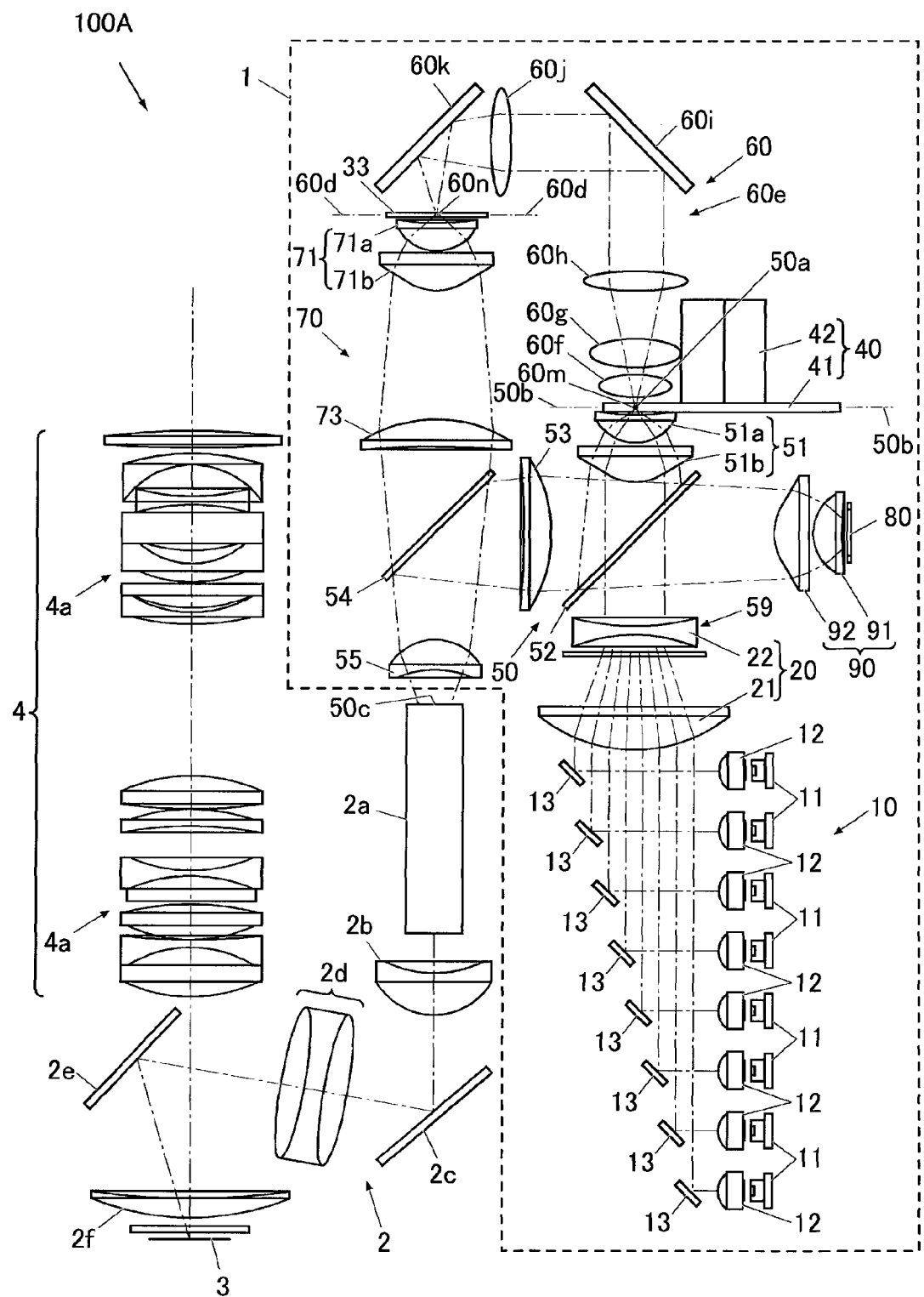
FIG. 3 is a plan view of a projector apparatus according to a second embodiment of the present invention.

FIG. 3 is a plan view of a projector apparatus 100A. The corresponding components between the projector apparatus 100 of the first embodiment and the projector apparatus 100A of the second embodiment are indicated by the same reference signs.

The projector apparatus 100A is different from the projector apparatus 100 in its translucent diffuser plate 33, transfer optical system 60 and second casting optical system 70. Hereinafter, the difference between the projector apparatus 100A and the projector apparatus 100 will be mainly described. Except for the features described below, the components of the projector apparatus 100A are the same as the corresponding components of the projector apparatus 100.

The second casting optical system 70 includes a lens group 71, a lens 73 and a lens 55, but does not include the flat mirror 72 (see FIG. 1). The optical axis of the lens group 71 is coincident with the optical axis of the lens 73 and lens 55, and is parallel to the optical axis of the lens group 51. The translucent diffuser plate 33 is opposed to the lens group 71, and the optical axis of the lens group 71, lens 73 and lens 55 orthogonally intersects the translucent diffuser plate 33. Like the first embodiment, the lens group 71 is the same as the lens group 51, and the lens 73 is the same as the lens 53. Further, the optical path length from the transfer plane 60d through the lens group 71, the lens 73, a second dichroic mirror 54 and the lens 55 to an incidence face 50c of a light guiding apparatus 2a is equal to the optical path length from the convergence plane 50b through the lens group 51, a first dichroic mirror 52, the lens 53, the second dichroic mirror 54 and the lens 55 to the incidence face 50c of the light guiding apparatus 2a.

The transfer optical system 60 is an imaging optical system 60e by which an image of a light source image (spot 50a) of transmitted light on the convergence plane 50b is formed onto the transfer plane 60d at the same magnification. The convergence plane 50b corresponds to the object plane of the imaging optical system 60e, and the transfer plane 60d corresponds to the imaging plane of the imaging optical system 60e. The transfer plane 60d is parallel to the convergence plane 50b, and the transfer plane 60d is perpendicular to the optical axis of the lens group 71, lens 73 and lens 55. The translucent diffuser plate 33 is disposed on the transfer plane 60d.

The imaging optical system 60e includes lenses 60f, 60g and 60h, a flat mirror 60i, a lens 60j and a flat mirror 60k. These lenses 60f, 60g and 60h, flat mirror 60i, lens 60j and flat mirror 60k define a first convergence point 60m and a second convergence point 60n. The first convergence point 60m is coincident with the intersection of the optical axis of an excitation light source unit 10, a narrowing optical system 20 and the lens group 51 with the convergence plane 50b, and is also coincident with the light source image (spot 50a) of the transmitted light. The second convergence point 60n is coincident with the intersection of the optical axis of the lens group 71 with the transfer plane 60d.

The lenses 60f, 60g and 60h are opposed to the lens group 51 across the optical plate 41, and the optical axis of the lenses 60f, 60g and 60h is coincident with the optical axis of the lens group 51. The lens 60j is disposed between the optical axis of the lens group 71 and the optical axis of the lens group 51, and the optical axis of the lens 60j orthogonally intersects the optical axes of the lens group 71 and lens group 51. The flat mirror 60i is disposed at the intersection of the optical axis of the lenses 60f, 60g and 60h with the optical axis of the lens 60j. The flat mirror 60i intersects the optical axis of the lenses 60f, 60g and 60h at an oblique angle of 45°, and also intersects the optical axis of the lens 60j at an oblique angle of 45°. Further, the flat mirror 60i is perpendicular to the dichroic mirrors 52 and 54. The flat mirror 60k is disposed at the intersection of the optical axis of the lens 60j with the optical axis of the lens group 71. The flat mirror 60k intersects the optical axis of the lens 60j at an oblique angle of 45°, and also intersects the optical axis of the lens 71 at an oblique angle of 45°. Further, the flat mirror 60k is parallel to the dichroic mirrors 52 and 54.

Since the optical axis of the lenses 60f, 60g, 60h and 60j is bent by the flat mirrors 60k and 60i, the transfer plane 60d is parallel to the incidence face 50c of the light guiding apparatus 2a and the convergence plane 50b, and is also opposed to the incidence face 50c of the light guiding apparatus 2a.

The transmitted light that has passed through a translucent diffuser plate 41e of the optical plate 41 (excitation light that has passed through the spot 50a) is condensed by the lenses 60f, 60g and 60h, reflected on the flat mirror 60i toward the lens 60j and flat mirror 60k, condensed by the lens 60j, and then reflected on the flat mirror 60k toward the translucent diffuser plate 33. In this way, the transmitted light that has passed through the translucent diffuser plate 41e of the optical plate 41 is converged to the second convergence point 60n, and its light spot (convergence spot) is formed on the translucent diffuser plate 33 and on the transfer plane 60d. Because the imaging optical system 60e is a same-size projection optical system, the spot formed on the transfer plane 60d and translucent diffuser plate 33 has the same diameter as the spot 50a on the convergence plane 50b.

Like the first embodiment, an enlarged image of the spot (light source image of the transmitted light) on the translucent diffuser plate 33 and the transfer plate 60d is projected onto the incidence face 50c of the light guiding apparatus 2a by the second casting optical system 70.

As described above, according to the embodiments of the present invention, when different lights are emitted from the convergence plane 50b, for example, when two types of lights of excitation light and fluorescence are emitted from a wheel plate 41a where a fluorescent substance layer 41d and a translucent diffuser plate 41e are applied on the convergence plane 50b, the optical path length (length of the optical axis) of the blue excitation light from the transfer plane 60d to the incidence face 50c is equal to the optical path length (length of the optical axis) of the green fluorescence from the convergence plane 50b to the incidence face 50c. This can prevent misalignment of the irradiation area of the fluorescence with the irradiation area of the excitation light on the common casting plane. Further, this can also conform the light distribution of the fluorescence to the light distribution of the excitation light on the common casting plane.

(Variations)

Embodiments of the present invention are not limited to the above-described embodiments, and any changes and modifications may be made in the embodiments without departing from the spirit and scope of the invention. Hereinafter, some variations will be described. The following variations have the same configuration as the above-described first or second embodiment except for the modified component. The following variations may be combined if possible.

(1) The transfer optical system 60 may include two parabolic concave mirrors and optionally one or more flat mirror if necessary. One of the parabolic concave mirrors is a paraboroidal mirror which is defined by rotating a parabola which has a focal point at the above-described first focal point 60a or at the first convergence point 60m. The other parabolic concave mirror is a paraboroidal mirror which is defined by rotating a parabola which has a focal point at the above-described second focal point 60b or at the second convergence point 60n. With this configuration, the transmitted light that has passed through the translucent diffuser plate 41e is reflected on one of the parabolic concave mirrors to be approximate parallel light. The approximate parallel light is reflected on the optional flat mirror if necessary, and is then converged by the other of the parabolic concave mirrors to the focal point thereof (second focal point 60b or the second convergence point 60n).

(2) In the above-described first and second embodiments, the excitation light source unit 10 emits the blue excitation light, the second light source 80 emits the red light, and the fluorescent substance layer 41d emits the green fluorescence. The colors of these lights may be changed. In this case, a wavelength band for reflection and a wavelength band for transmission of each of the dichroic mirrors 52, 54 are changed appropriately. It is preferred that the excitation light emitted from the excitation light source unit 10, the light emitted from the second light source 80 and the fluorescence emitted from the fluorescent substance layer 41d have different colors of three primary colors of light.

(3) In the above-described first and second embodiment, the excitation light source unit 10 includes the plurality of high-directional excitation light sources 11. However, the excitation light source unit 10 may include a single low-directional excitation light source instead. In this case, the refractive power and position of the narrowing optical system 20 is adjusted so that the excitation light emitted from the single excitation light source of the excitation light source unit 10 is converged to the convergence plane 50b by means of the narrowing optical system 20 and the lens group 51 to form a spot at the first focal point 60a or the first convergence point 60m. That is, an image of the excitation light source is projected (formed) onto the first focal point 60a or the first convergence point 60m by means of the narrowing optical system 20 and the lens group 51.

Figure 4:
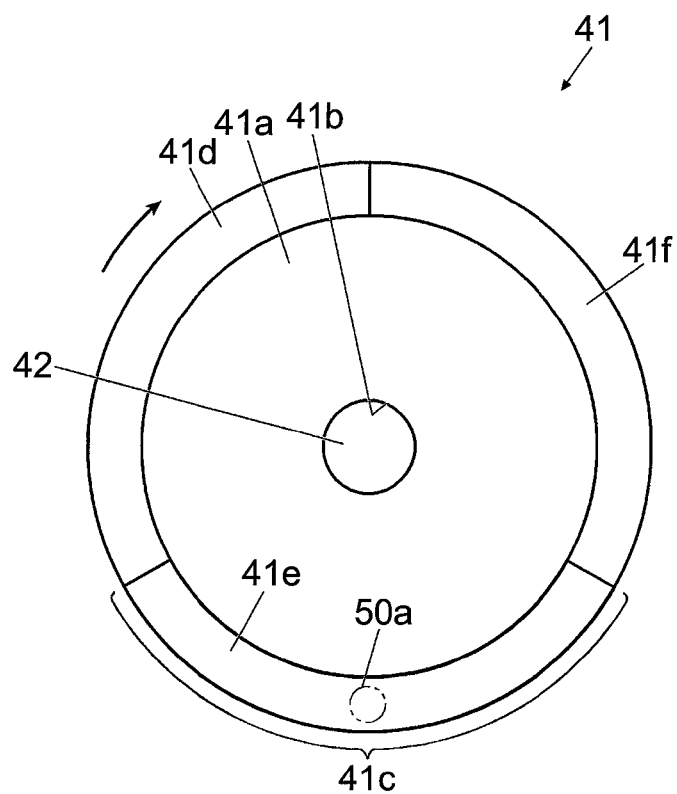
FIG. 4 is a plan view of an optical plate according to a variation.

(4) In the above-described first and second embodiments, the fluorescent substance layer 41d is applied on the whole area along the circumference other than the area of the translucent segment 41c. However, as illustrated in FIG. 4, the fluorescent substance layer 41d may be applied on a part (e.g. half of the rest) of the area along the circumference other than the area of the translucent segment 41c. It is preferred that an anti reflection layer 41f is applied on the remaining, part along the circumference where neither the translucent segment 41c nor the fluorescent substance layer 41d is applied. It is preferred that while the part where the fluorescent substance layer 41d is not applied (anti reflection layer 41f) is crossing the optical axis of the lens group 51, the excitation light source 11 is off.

Figure 5:
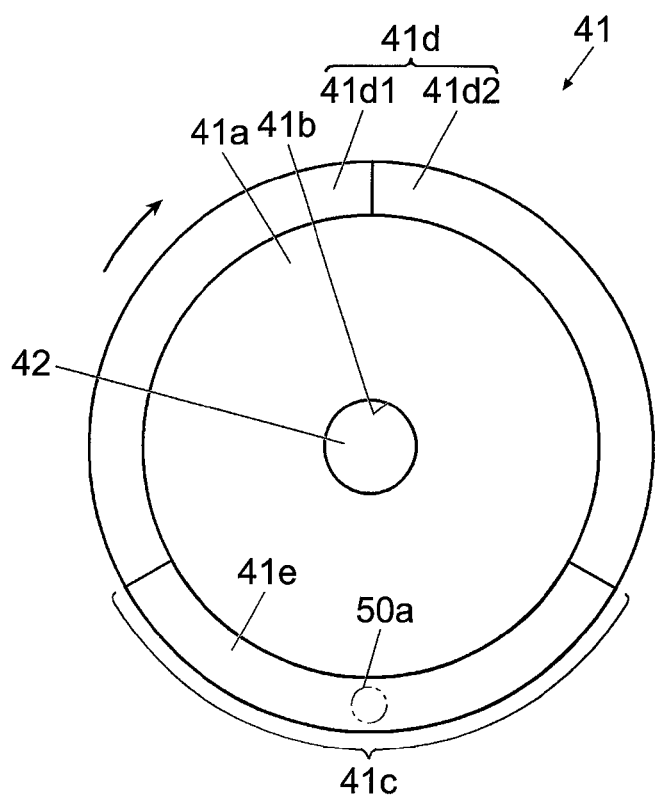
FIG. 5 is a plan view of an optical plate according to another variation.

(5) As illustrated in FIG. 5, the fluorescent substance layer 41d may be divided into two fluorescent substance layers 41d1 and 41d2 in the circumferential direction where the first fluorescent substance layer 41d1 has a different fluorescent color from the second fluorescent substance layer 41d2. Seen from the axial direction, the first fluorescent substance layer 41d1 and second fluorescent substance layer 41d2 are disposed along the same circumference at different positions in the circumferential direction. The fluorescences emitted from the fluorescent substance layers 41d1 and 41d2 may be within any wavelength band as long as their colors are different from the color of the excitation light. However, monochromatic visible light is preferred. Specifically, the excitation light, the fluorescence emitted from the first fluorescent substance layer 41d1 and the fluorescence emitted from the second fluorescent substance layer 41d2 have different colors of three primary colors of light. For example, the excitation light is within a blue wavelength band, the fluorescence emitted from the first fluorescent substance layer 41d1 is within a green wavelength band, and the fluorescence emitted from the second fluorescent substance layer 41d2 is within a red wavelength band. In this case, the excitation light source 11 is always on, and the second light source 80 and the condensing optical system 90 are omitted. Further, the first dichroic mirror 52 not only reflects the fluorescence emitted from the first fluorescent substance layer 41d1 toward the lens 53, but also reflects the fluorescence emitted from the second fluorescent substance layer 41d2 toward the lens 53.

(6) The translucent diffuser plate 41e may be omitted. In this case, it is preferred that the translucent diffuser plate 33 moves along the transfer plane 60d so that the excitation light is not converged to a single spot on the translucent diffuser plate 33. For example, the translucent diffuser plate 33 may rotate about a rotation axis that is parallel to the optical axis of the lens group 71 (but is deviated from the second focal point 60b). As a result, the spot (light source image) of the excited light incident to the translucent diffuser plate 33 draws a circular locus on the translucent diffuser plate 33, which prevents the excitation light from being converged to a certain point on the translucent diffuser plate 33.

(7) The translucent diffuser plate 33 may be omitted.

(8) In the embodiments of the present invention, the transfer plane 60d is defined on the translucent diffuser plate 33. However, the present invention is not limited thereto, and it should be understood that the transfer plane 60d may be defined on a transmissive plate of glass or the like instead of on the translucent diffuser plate 33.

While the embodiments of the present invention are described, the scope of the present invention is not intended to be limited to the above-described embodiments, but is defined by the scope of the claims including the full scope of their equivalents.

The present invention is not limited to the above-described embodiments, and changes and modifications may be made for embodying the invention without departing from the spirit and scope of the invention. Further, the functions of the above-described embodiments may be suitably combined if possible. The above-described embodiments include various stages, and a variety of aspects of the invention may be extracted from a suitable combination of the disclosed plurality of components. For example, if an advantageous effect is still obtainable even though some components are removed from the full components in an embodiment, the configuration without such components can be extracted as an aspect of the invention.

What is claimed is:

1. A light source apparatus, comprising:
   a rotary driver;
   an optical plate which is rotated by the rotary driver and which includes a translucent segment and a fluorescent substance layer;
   an excitation light source unit which emits excitation light;
   a convergence optical system which converges the excitation light emitted from the excitation light source unit to the translucent segment and to the fluorescent substance layer;
   a transfer optical system which transfers a spot of the excitation light converged to the translucent segment by the convergence optical system to a transfer plane different from an optical plate plane of the optical plate;
   a first casting optical system which projects a light source image of fluorescence onto a common casting plane different from both the optical plate plane and the transfer plane, wherein the convergence optical system converges the excitation light to the fluorescent substance layer to form the light source image of the fluorescence on the fluorescent substance layer; and
   a second casting optical system which projects the spot of the excitation light transferred on the transfer plane by the transfer optical system onto the common casting plane,
   wherein an optical path length of the first casting optical system from the optical plate plane to the common casting plane is equal to an optical path length of the second casting optical system from the transfer plane to the common casting plane,
   wherein the transfer optical system includes an ellipsoidal concave mirror,
   wherein a first focal point of the ellipsoidal concave mirror is positioned at the spot of the excitation light converged to the optical plate plane by the convergence optical system,
   wherein a second focal point of the ellipsoidal concave mirror is on the transfer plane, and
   wherein the transfer plane is perpendicular to the optical plate plane and to the common casting plane.

2. The light source apparatus according to claim 1, wherein a refractive power of the first casting optical system is equal to a refractive power of the second casting optical system.

3. The light source apparatus according to claim 1,
   wherein the first casting optical system includes:
      a first lens group which is opposed to the optical plate plane and which has an optical axis which orthogonally intersects the optical plate plane at the first focal point;
      a first lens which has an optical axis which orthogonally intersects the optical axis of the first lens group; and
      a first dichroic mirror which is disposed at an intersection of the optical axis of the first lens group with the optical axis of the first lens, which transmits the excitation light emitted from the excitation light source unit toward the first lens group, and which reflects the fluorescence which passed through the first lens group toward the first lens after being emitted from the fluorescent substance layer,
   wherein the second casting optical system includes:
      a second lens group which is opposed to the transfer plane and which has an optical axis which orthogonally intersects the transfer plane at the second focal point;
      a second lens which has an optical axis which orthogonally intersects the optical axis of the second lens group; and
      a mirror which is disposed at an intersection of the optical axis of the second lens group with the optical axis of the second lens, and which reflects the excitation light which passed through the second focal point and through the second lens group toward the second lens, and
   wherein the first casting optical system and the second casting optical system include:
      a third lens which is opposed to the second lens and to the common casting plane between the second lens and the common casting plane, and which has an optical axis which is coincident with the optical axis of the second lens; and
      a second dichroic mirror which is disposed between the second lens and the third lens at an intersection of the optical axis of the first lens with the optical axis of the second lens, which transmits the excitation light which passed through the second lens toward the third lens, and which reflects the fluorescence which passed through the first lens toward the third lens.

4. The light source apparatus according to claim 3, wherein the first lens group and the second lens group have a same refractive power, and
   wherein the first lens and the second lens have a same refractive power.

5. The light source apparatus according to claim 3, wherein an optical path length from the optical plate plane through the first lens group, the first dichroic mirror, the first lens, the second dichroic mirror and the third lens to the common casting plane is equal to an optical path length from the transfer plane through the second lens group, the mirror, the second lens, the second dichroic mirror and the third lens to the common casting plane.

6. A projector apparatus, comprising:
   the light source apparatus according to claim 1;
   a light source optical system which further casts the excitation light and the fluorescence casted on the common casting plane by the light source apparatus;
   a display device which modulates the light casted from the light source optical system pixel by pixel to generate an image; and
   a projection optical system which projects the image generated by the display device.

* * * * *